(12) United States Patent
Praharaj et al.

(10) Patent No.: US 11,642,855 B2
(45) Date of Patent: May 9, 2023

(54) SYSTEM AND METHOD FOR MANUFACTURING MICRONEEDLE ASSEMBLIES WITH MEDICAMENTS

(71) Applicant: Xerox Corporation, Norwalk, CT (US)

(72) Inventors: Seemit Praharaj, Webster, NY (US); Chu-Heng Liu, Penfield, NY (US); Douglas K. Herrmann, Webster, NY (US); Jason M. LeFevre, Penfield, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 20 days.

(21) Appl. No.: 17/214,029

(22) Filed: Mar. 26, 2021

(65) Prior Publication Data

US 2022/0305736 A1 Sep. 29, 2022

(51) Int. Cl.
*B29C 64/40* (2017.01)
*B29C 64/118* (2017.01)
*B29C 64/245* (2017.01)
*B29C 64/209* (2017.01)
*B33Y 30/00* (2015.01)
*B33Y 10/00* (2015.01)

(52) U.S. Cl.
CPC ............ *B29C 64/40* (2017.08); *B29C 64/118* (2017.08); *B29C 64/209* (2017.08); *B29C 64/245* (2017.08); *B33Y 10/00* (2014.12); *B33Y 30/00* (2014.12)

(58) Field of Classification Search
CPC ..... B29C 64/40; B29C 64/118; B29C 64/209; B29C 64/245; B33Y 30/00
See application file for complete search history.

(56) References Cited

U.S. PATENT DOCUMENTS

| 10,862,816 B2 | 6/2020 | Mantell et al. | |
| 2017/0320270 A1* | 11/2017 | Mandel | B33Y 50/02 |
| 2020/0086560 A1* | 3/2020 | Blair | B29C 33/44 |

OTHER PUBLICATIONS

He, X et a., "Microneedle System for Transdermal Drug and Vaccine Delivery: Devices, Safety, and Prospects," Dose-Response, Oct.-Dec. 2019, pp. 1-18 (18 pages).
Lee; W. H. et al., "Inkjet Etching of Polymers and Its Applications in Organic Electronic Devices," Polymers, 2017, vol. 9, No. 441 (16 pages).
Camović, M. et al., "Coated 3D Printed PLA Microneedles as Transdermal Drug Delivery Systems," International Conference on Medical and Biological Engineering, 2019, pp. 735-742 (9 pages).

* cited by examiner

*Primary Examiner* — Joseph S Del Sole
*Assistant Examiner* — Mohamed K Ahmed Ali
(74) *Attorney, Agent, or Firm* — Maginot Moore & Beck LLP (57) ABSTRACT

An additive manufacturing system has an extruder and a printhead module with a conveyor for moving between the extruder and the printhead module. The extruder is operated to form a support layer having microneedle protrusions. The conveyor moves the support layer having the microneedle protrusions to a position opposite the printhead module for sharpening of the microneedle protrusions and the application of a medicament to the sharpened microneedle protrusions.

9 Claims, 6 Drawing Sheets

SYSTEM AND METHOD FOR MANUFACTURING MICRONEEDLE ASSEMBLIES WITH MEDICAMENTS

TECHNICAL FIELD

This disclosure is directed to three-dimensional object printers and, more particularly, to the formation of objects having medicaments with such printers.

BACKGROUND

Inkjet imaging devices, such as inkjet printers, are well known. These printers eject liquid ink from printheads to form images on an image receiving surface. The printheads include a plurality of inkjets that are arranged in some type of array. Each inkjet has a thermal or piezoelectric actuator that is coupled to a printhead controller. The printhead controller generates firing signals that correspond to digital data for images. The actuators in the printheads respond to the firing signals by ejecting ink drops onto an image receiving member and form an ink image that corresponds to the digital image used to generate the firing signals.

Although additive manufacturing systems are sometimes called printers, the technologies and techniques used by these systems are quite different than inkjet printing processes. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The extruder moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, an extruder with a larger nozzle diameter can form three-dimensional printed objects more quickly but the ability to emit build material in finer shapes for higher detailed objects is lost while nozzles with narrower diameters can form finer detailed structures but require more time to build three-dimensional objects.

To address the limitations of single nozzle extruders, multi-nozzle extruders have been developed. In some of these multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of a swath of thermoplastic material extruded from the nozzles to be varied by changing the number of nozzles extruding material and selecting which nozzles are extruding material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruded from the nozzles. Again, these variations are achieved by changing the number of nozzles extruding material and selecting which nozzles extrude material. These multi-nozzle extruders enable different materials to be extruded from different nozzles and can be used to form an object without having to coordinate the movement of individual extruders. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form some areas of an object, such as its interior regions.

Hypodermic needles are a nearly universally accepted approach for drug delivery, yet they suffer from several significant issues. For one, administration of a drug by the patient using hypodermic needles is not commonly recommended so injections usually require a clinical visit where trained personnel administer the drug. Additional issues include pain associated with the needle delivery, filling the syringe with the correct drug dosage, and proper disposal of the used needles. To address some of these concerns, biocompatible microneedles have been developed. These microneedles are arrayed on a pliable substrate, pre-loaded with a drug, and then protectively covered. At an appropriate time, the protective covering is removed and the substrate is pushed against the skin to insert the ends of the microneedles for transdermal delivery of the pre-loaded drug. Manufacture of a microneedle array requires multiple stations for making different components of the array that are assembled and loaded with a drug. This process requires human operator participation and oversight. Additive manufacturing is playing an increased role in the medical industry, for example, additive manufacturing has been used for organ and tissue fabrication and for the production of custom prosthetics; however additive manufacturing is not used for microneedle fabrication and drug application. Being able to additively manufacture microneedle arrays pre-loaded with a drug without operator participation would be beneficial.

SUMMARY

A new additive manufacturing apparatus produces microneedle assemblies that include drugs for delivery by the assemblies. The apparatus includes a conveyor, at least one extruder configured to extrude a thermoplastic material toward the conveyor, at least one printhead module having a plurality of ejectors configured to eject drops of a fluid toward the conveyor, at least one actuator operatively connected to the conveyor and the extruder, the at least one actuator being configured to move the extruder in an X-Y plane parallel with an upper surface of the conveyor, and to change a distance between the extruder and the upper surface of the conveyor along a Z-axis perpendicular to the X-Y plane, and a controller operatively connected to the at least one extruder, the at least one printhead module, and the conveyor. The controller is configured to operate the least one extruder to form a support layer having microneedle protrusions on the upper surface of the conveyor, operate the conveyor to move the support layer having the microneedle protrusions to a position opposite the at least one printhead module, and operate the ejectors in the at least one printhead module to apply a medicament to the microneedle protrusions.

A method of operating the new additive manufacturing apparatus produces microneedle assemblies that include drugs for delivery by the assemblies. The method includes operating at least one extruder to form a support layer having microneedle protrusions, moving the support layer having the microneedle protrusions to a position opposite a printhead module, and operating ejectors in the at least one printhead module to apply a medicament to the microneedle protrusions.

BRIEF DESCRIPTION OF THE DRAWINGS

The foregoing aspects and other features of an additive manufacturing apparatus and its method of operation that produces microneedle assemblies that include drugs for delivery by the assemblies are explained in the following description taken in connection with the accompanying drawings.

DETAILED DESCRIPTION

For a general understanding of the environment for the system disclosed herein and its use as well as the details for the system and its use, reference is made to the drawings. In the drawings, like reference numerals designate like elements.

As used herein, the term "extrusion material" refers to a solid material that is softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl acetate (PVA), and other materials capable of extrusion after being thermally treated. In some extrusion printers, the solid extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other forms of extrusion material can be used, such as particulate, cylindrical pellets, or spherical ball solid extrusion materials. The heater softens or melts the solid extrusion material to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to solid extrusion material refers to any elevation of temperature for the solid extrusion material that softens the material or changes the phase of the extrusion material from solid to liquid to enable extrusion of the resulting thermoplastic material through one or more nozzles in an extruder during operation of a three-dimensional object printer. As used in this document, the term "thermoplastic material" means solid extrusion material that has been melted. As those of skill in the art recognize, certain amorphous extrusion materials do not transition to a pure liquid state during operation of the printer.

As used herein, the term "extruder" refers to a component that melts solid extrusion material in a single fluid chamber and provides the melted extrusion material to a manifold connected to one or more nozzles. Some extruders include a valve assembly that can be electronically operated to enable thermoplastic material to flow through nozzles selectively. The valve assembly enables two or more nozzles to be connected to the manifold independently to extrude the thermoplastic material through the connected nozzles. As used herein, the term "nozzle" refers to an orifice in a faceplate of an extruder that is fluidly connected to the manifold in an extruder and through which thermoplastic material is emitted towards a material receiving surface. During operation, the nozzle can extrude a substantially continuous linear swath of the thermoplastic material along a path as the extruder is moved in a process direction. A controller operates the valves in the valve assembly to control which nozzles are connected by the valve assembly to the manifold for extrusion of the thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material emitted from one or more nozzles of the extruder onto a material receiving surface during a three-dimensional object printing operation. Common swaths include straight-line linear arrangements of thermoplastic material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of thermoplastic material prior to operating the extruder to form each swath of extrusion material. The controller optionally adjusts the operation of the valve assembly and the rotation of the extruder to form multiple swaths of thermoplastic material through one or more nozzles during a three-dimensional printing operation.

As used herein, the term "process direction" refers to a direction of motion for an extruder or inkjet printhead with respect to a material receiving surface while the extruder or inkjet printhead applies thermoplastic material or fluid drops to the material receiving surface or object on the material receiving surface. For a curved swath, a tangent line to the curve identifies the process direction. The material receiving surface is either a support member that holds a three-dimensional printed object or a surface of the partially formed three-dimensional object during an additive manufacturing process. In the illustrative embodiments described herein, one or more actuators are operatively connected to the extruder to move the extruder in a X-Y plane above the support member to form layers on the support member and to move the extruder or an object support platform bidirectionally along a Z-axis that is perpendicular to the X-Y plane.

As used herein, the term "cross process direction" refers to an axis that is perpendicular to the process direction and parallel to the extruder or inkjet printhead faceplate and the material receiving surface. The process direction and cross-process direction refer to the path of movement of the extruder above the surface that receives the thermoplastic material. In some configurations, the extruder and the inkjet printhead includes an array of nozzles that can extend in the process direction alone, the cross-process direction alone, or both. Adjacent nozzles within the extruder or inkjet printhead are separated by a predetermined distance in the cross-process direction. In some configurations, the system rotates the extruder to adjust the effective cross-process direction distance that separates different nozzles in the extruder to change the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z-axis to adjust the effective cross-process distance that separates nozzles in the extruder so the extruder forms two or more lines of thermoplastic material with predetermined distances between each line of the thermoplastic material. As used in this document, the term "Z-direction" refers to a direction of movement that is perpendicular to the plane in which the process direction and cross-process direction are orthogonal to one another, which is sometimes called the X-Y plane in this document. The extruder moves both along the outer perimeter to form outer walls of a two-dimensional region in a layer of the printed object and within the perimeter to fill all or a portion of the two-dimensional region with the thermoplastic material.

Figure 1:
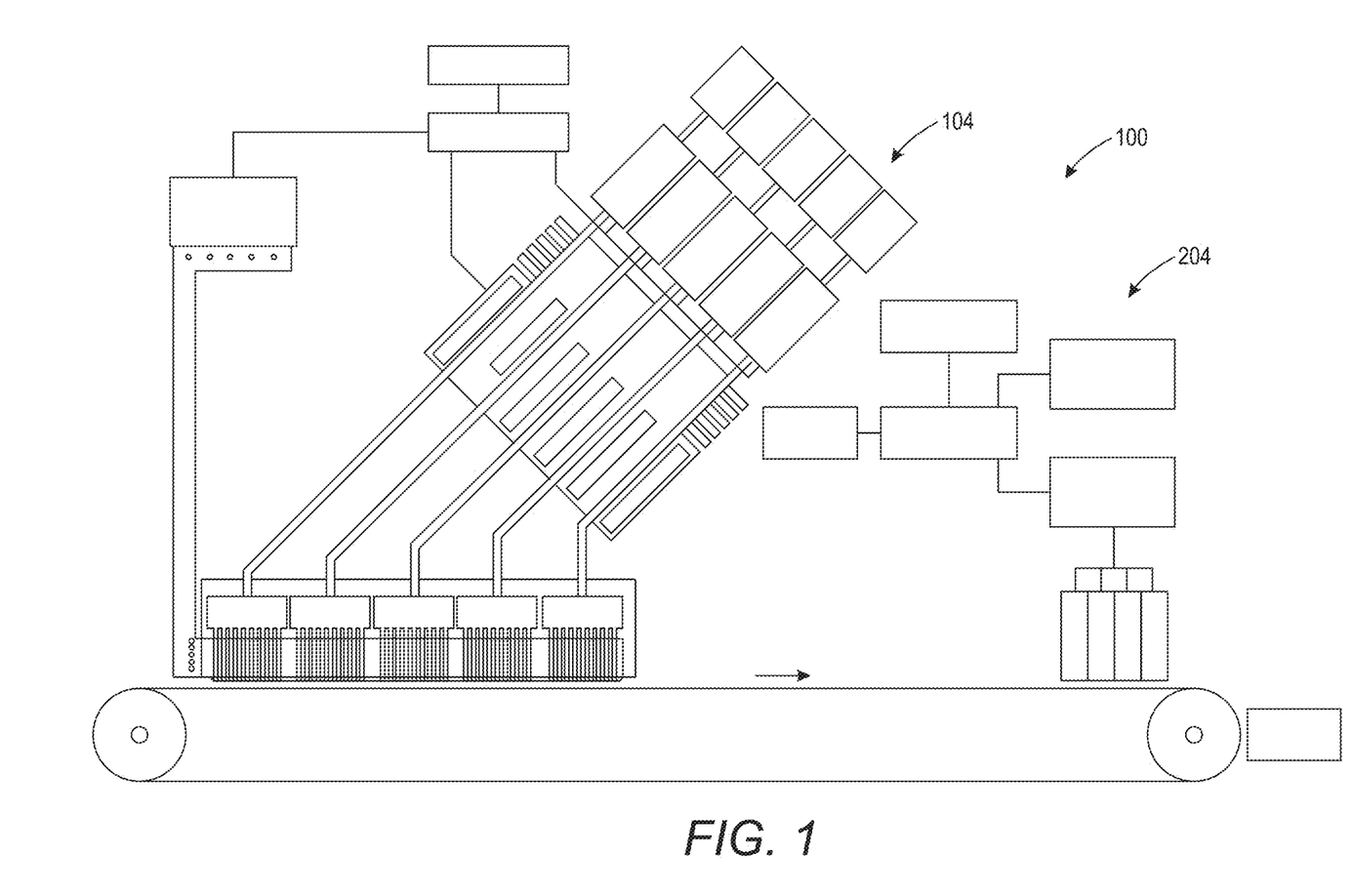
FIG. 1 depicts an additive manufacturing apparatus that forms a microneedle array on a biocompatible substrate and that applies a drug to the microneedles.
Figure 2A:
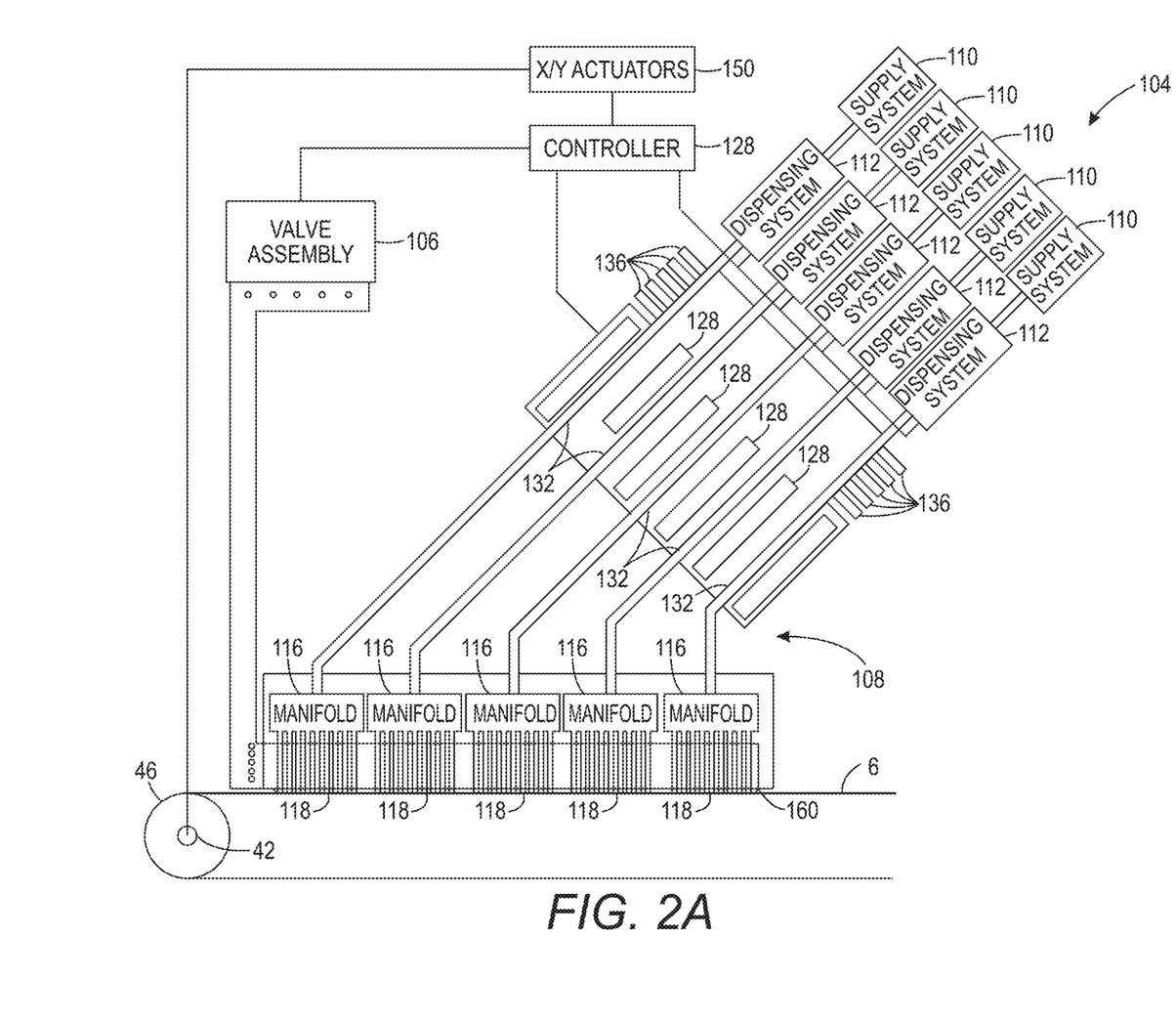
FIG. 2A depicts the extruder apparatus of the apparatus in FIG. 1 in more detail.

FIG. 1 depicts an additive manufacturing system 100 having an extrusion system 104 and an inkjet printing system 204 that produces a complete microneedle assembly as described in more detail below. Alternative architectures for the extrusion system include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Movements of the extruder above the support member in the X-Y plane and along Z-axis perpendicular to the X-Y plane are achieved by the controller 128 operating one or more actuators 150 (FIG. 2A). Movement of the extruder in the X-Y plane is used to form individual layers of the microneedle assembly and movement along the Z-axis is used to maintain an appropriate distance between the faceplate 160 of the extruder 108 and a surface upon which the extruder applies thermoplastic material.

The extruder 108 has a plurality of manifolds 116 and each manifold 116 in the extruder 108 is operatively connected to heater 114. Heater 114 is fed by a plurality of extrusion material dispensing systems 112 in a one-to-one correspondence with the channels 132 that feed the manifolds 116. Alternatively, each manifold 116 can be coupled to a heater 114 having a single channel 132 in a one-to-one correspondence to receive thermoplastic material. Each heater in this embodiment is fed by a corresponding extrusion material dispensing system 112. In the embodiment of FIG. 2A, each channel 132 supplies thermoplastic material to a manifold 116 in the extruder 108 so each manifold can receive a thermoplastic material that is different than a material that the other manifolds are receiving. In the extruder 108, each nozzle array 118 is fluidly connected to only one of the manifolds within the extruder 108 so each nozzle array can extrude a thermoplastic material that is different than the materials extruded from the other nozzle arrays connected to other manifolds. Extrusion from each nozzle in each nozzle array 118 is selectively and independently activated and deactivated by controller 128 operating the valves in the valve assembly 106. Each nozzle in each nozzle array 118 is also aligned with an aperture in a faceplate 160 to configure the nozzles for more flexible formation of swaths of the materials in an object.

In the embodiment of FIG. 2A, the valve assembly 106 positions a valve between the manifolds in the extruder 108 and each of the nozzles in the nozzle arrays 118 that are connected to the manifolds in the extruder 108. The valve assembly 106 is operatively connected to the controller 128 so the controller can open and close the valves for extruding thermoplastic material from the plurality of nozzles in the extruder 108. Specifically, the controller 128 activates and deactivates different actuators in the assembly 106 that are connected to the valve stems in the extruder 108 to extrude thermoplastic material from the nozzles and form swaths of different thermoplastic materials in each layer of a three-dimensional printed object, such as the microneedle array shown in FIG. 3.

The extrusion system 104 of FIG. 2A also includes a plurality of extrusion material supplies that are operatively connected to the extrusion material dispensing systems 112 in a one-to-one correspondence. The extrusion material from each separate supply 110 is fed to the corresponding channel 132 in the heater 114 at a rate that maintains the pressure of the thermoplastic material in each manifold 118 of the extruder 108. The controller 128 is operatively connected to an actuator in each dispensing system 112 to control the rate at which each dispensing system 112 delivers extrusion material from a corresponding supply 110 to the channel 132 of the heater 114 fed by the supply. The dispensing systems 112 can be configured in a known manner with a pair of rollers that form a nip and, at least one roller is rotated by an actuator, to move the solid filament from a supply 110 into the corresponding dispensing system 112. Each dispensing system 112 is also configured with a slip clutch that is operated by the controller 128 to control the feeding of the filament to the corresponding channel in the heater 114. Alternative embodiments of the dispensing systems 112 use one or more actuators to operate a mechanical mover in the form of a rotating auger or screw. The auger or screw moves solid phase extrusion material from a supply 110 in the form of extrusion material powder, spheres, or pellets into the channels 132 of the heater 114.

Heater 114 has a body formed from stainless steel that includes one or more heating elements 128, such as electrically resistive heating elements, which are operatively connected to the controller 128. Controller 128 is configured to connect the heating elements 128 to electrical current selectively to soften or melt the filaments of extrusion material in the channels 132 within the heater 114. Cooling fins 136 attenuate heat in the portions of the channels 132 that are upstream from the heater 114. A portion of the extrusion material that remains solid in a channel at or near the cooling fins 136 forms a seal in the channel that prevents thermoplastic material from exiting the heater from any opening other than the connection to the manifold 116, which maintains a temperature that keeps the extrusion material in a thermoplastic state as it enters the manifold. The extruder 108 can also include additional heating elements to maintain an elevated temperature for the thermoplastic material within each manifold within the extruder. The regions around the nozzles in the nozzle arrays 118 and the apertures in the faceplate 160 are maintained at a temperature that keeps the material in a thermoplastic state so it does not begin solidifying as it travels to the apertures in the faceplate.

The system of FIG. 1 also includes an inkjet printer 204 that is used in conjunction with the extrusion system 104 to produce microneedle assemblies for delivering one or more drugs. The inkjet printer 204 is shown in more detail in FIG. 2B. A conveyor belt 6 is configured as an endless belt about roller 38 (FIG. 2B) and roller 46 (FIG. 2A), although other configurations of moving conveyors can be used. These rollers are mounted about shafts 36 and 42, respectively. One or both of the shafts are operatively connected to one of the actuators 150 so the controller 128 can operate the actuator(s) to rotate the belt 6 about the rollers. Thus, belt 6 proves support for the microneedle assembly while it is being formed by the extrusion system 104 and then the controller 128 operates one of the actuators 150 to rotate the belt 6 about the rollers 38 and 46 to move the microneedle assembly to a position opposite the inkjet printer 204 for enhancement of the microneedle assembly and application of the drug to the microneedle assembly. A collection bin 72 for catching completed microneedle assemblies as they fall from the conveyor belt 6 is provided at the end of the conveyor belt.

The inkjet printer 204 includes one or more printhead modules. In the embodiment shown in FIG. 2B, the inkjet printer 204 includes four printhead modules 34A, 34B, 34C, and 34D, although fewer or more printhead modules can be used. In one embodiment, each printhead module has only one printhead that has a width that corresponds to a width of the widest microneedle assembly in the cross-process direction that can be processed by the system 100. In other embodiments, each printhead module has a plurality of printheads with each printhead having a width that is less than a width of the widest microneedle assembly in the cross-process direction that the system can produce. In these modules, the printheads are arranged in an array of staggered printheads so assemblies wider than a single printhead can be printed. Additionally, the printheads can also be interlaced so the density of the drops ejected by the printheads in the cross-process direction can be greater than the smallest spacing between adjacent inkjets in a printhead in the cross-process direction.

A fluid delivery system 20 has at least one reservoir containing one type of fluid to be ejected by the printhead modules. Since the printer 204 is configured for ejecting four types of fluids, the fluid delivery system 20 includes four fluid reservoirs. Each reservoir holds a different type of fluid with one type of fluid being useful for enhancing the needle points in a microneedle assembly, one type of fluid being a drug to be dispensed by the microneedle assembly, and the other fluids being useful for coating structures or time release materials for the medicaments printed on the assemblies. Each fluid reservoir is connected to the printhead or printheads in a printhead module to supply a particular type of fluid to the printhead or printheads in a module. Pressure sources and vents of the purge system 24 are also operatively connected between the fluid reservoirs and the printhead or printheads within the printhead modules to purge fluids from the printhead or printheads or to regulate the fluid levels in the printhead or printheads. Additionally, the purge module 20 includes a corresponding waste ink tank with a valve for each printhead in a printhead module for manifold and inkjet purge operations. The printhead modules 34A-34D can include associated electronics for operation of the one or more printheads by the controller 80 although those connections are not shown to simplify the figure. Although the printer 204 shown in FIG. 2B includes four printhead modules 34A-34D, each of which has two arrays of printheads, alternative configurations include a different number of printhead modules or printhead arrays within a module.

Figure 2B:
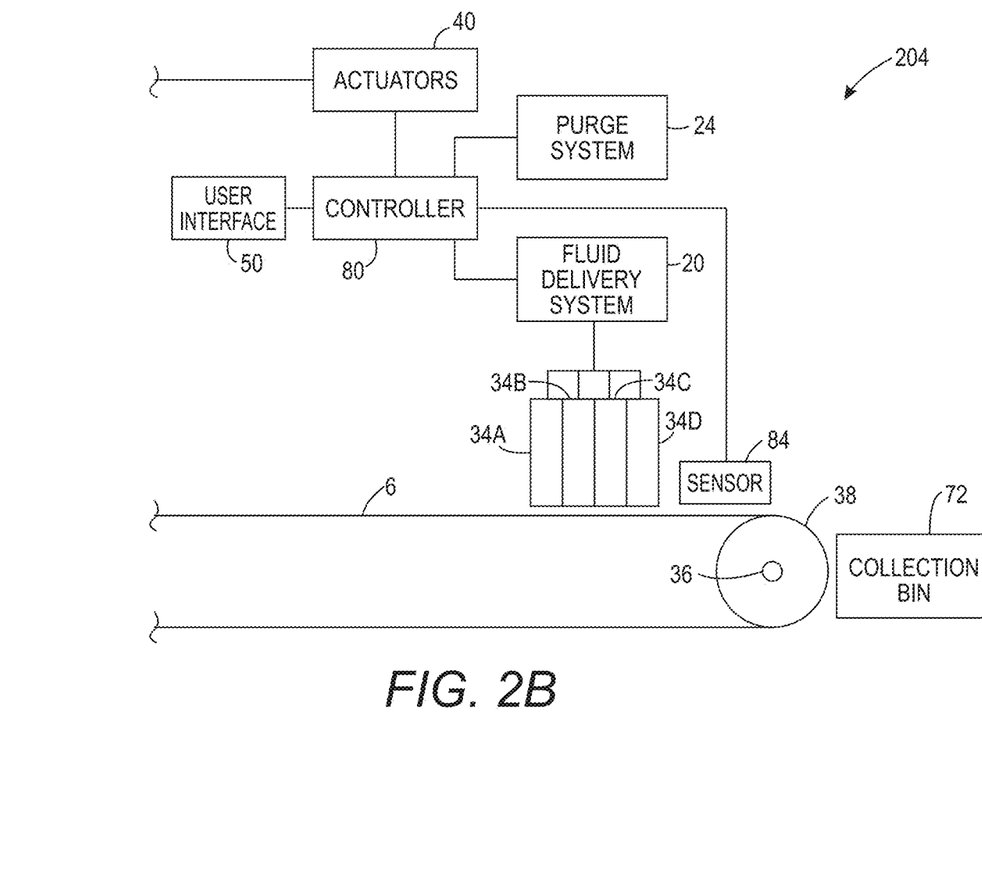
FIG. 2B depicts the inkjet apparatus of the apparatus in FIG. 1 in more detail.

Operation and control of the various subsystems, components and functions of the printer 204 are performed with the aid of the controllers 128 and 80. The controllers 128 and 80 are operably connected to the components of the extruder 108, the valve assembly 106, the heaters 128, the fluid delivery system 20, the purge system 24, the printhead modules 34A-34D (and thus the printheads), and the actuators 150 and 40. The controllers 128 and 80, for example, are self-contained, dedicated minicomputers having a central processor unit (CPU) with electronic data storage, and a display or user interface (UI) 50. The controllers 128 and 80, for example, include a sensor input and control circuit as well as a pixel placement and control circuit. In addition, the CPU reads, captures, prepares, and manages the image data flow between image input sources, such as a scanning system or an online or a work station connection, and the extruder 108 and the printhead modules 34A-34D. As such, the controllers 128 and 80 are the main multi-tasking processors for operating and controlling all of the other machine subsystems and functions in the printing system 204. The controllers 128 and 80 are operatively connected to each other for electronic communication to synchronize the operation of the extrusion system 104 and the printer 204 for the production of microneedle assemblies.

The controllers 80 and 128 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Figure 3:
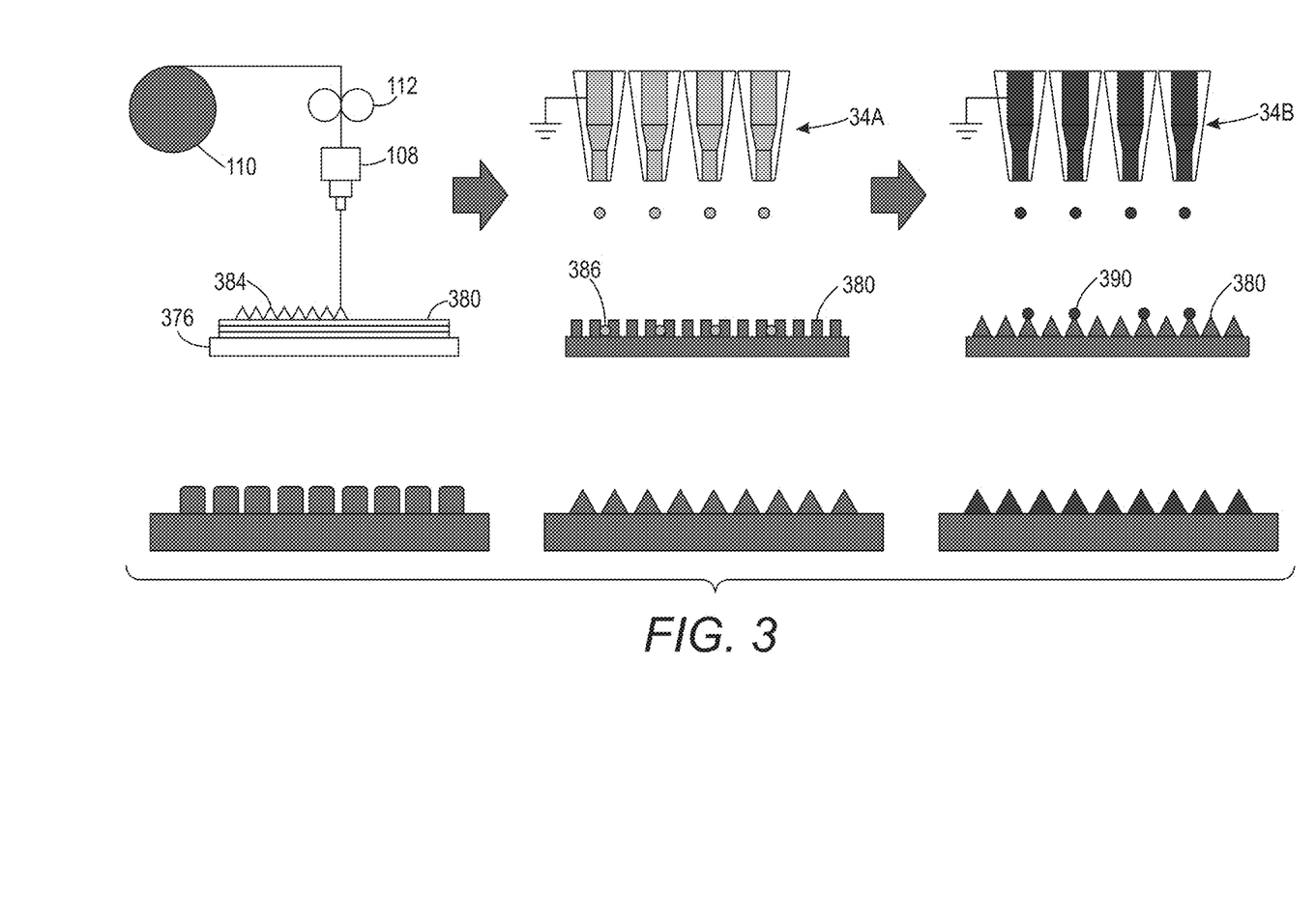
FIG. 3 depicts the process for forming the microneedles, sharpening the microneedles, and applying a drug to the microneedles by the system of FIG. 1.

The operation of the system 100 is now described with reference to FIG. 3. The controller 128 operates the extruder 108 to form a support layer 376 using polymer material extruded from one of the manifolds 116 (FIG. 2A) and then extrudes a biocompatible material from a different manifold 118 (FIG. 2A) to form microneedle protrusions 384 on the surface of the support layer 376. The needle assembly can be formed within a case, which is not shown to provide an unobstructed view of the assembly. An example of a biocompatible material useful for forming microneedles is polylactic acid, which is made from natural resources such as fermented plant starch, which can be made from corn, cassava, sugarcane, sugar beet, or the like. Polylactic acid is an FDA approved and fully biodegradable thermoplastic material. The support layer 376 and the protrusions 384 together form the microneedle assembly 380, which is shown in an exaggerated form beneath the depiction of the assembly formation. The controller 128 operates an actuator 150 to move the conveyor belt 6 so the microneedle assembly moves opposite printhead module 34A, although the position could be opposite one of the other printhead modules. As the controller 128 operates the actuator to move the assembly, it also generates a signal for the controller 80 that indicates a microneedle assembly is being provided to the printer 204 from the extrusion system 104. As used in this document, the term "microneedle protrusions" means structures that extend above the support layer of the microneedle assembly.

Upon receipt of the signal from controller 128, the controller 80 retrieves from a memory operatively connected to the controller 80 instructions that have previously been generated by a slicer for selectively operating the inkjets of the printhead or printheads in one of the modules to eject an etching fluid upon the microneedle protrusions. The drops of etching fluid sharpen the protrusions into needle points in those embodiments in which the microneedle protrusions are not formed with a point that is sufficient for transdermal delivery of a drug. A sensor 84 generates data corresponding to the degree of sharpness of the microneedles. The sensor 84 can be an image sensor, a laser sensor, or an ultrasonic sensor that generates data corresponding to the dimensions and shape of the microneedles. The controller 80 receives these data and compares them to an acceptable range for those parameters that are conducive for transdermal drug delivery. Once the needle dimensions and slopes are within acceptable ranges, the controller 80 stops the ejection of the etching fluid drops. Thus, the system 100 incorporates elements of additive manufacturing techniques to form structures and elements of subtractive manufacturing to refine those structures since the etching fluid removes material. The assembly 380 with the needle structures 386 is shown in an exaggerated form beneath the depiction of the needle etching. A typical length of microneedles is in a range of about 450 µm to about 550 µm and a typical diameter for the microneedles is in a range of about 50 µm to about 500 µm.

Once the needle parameters are within a toleration range for their length and diameter, the controller 80 generates a signal sent to controller 128 to synchronize operation of the conveyor and operates an actuator 40 to rotate the belt 6 and move the assembly 380 opposite another printhead module. The module to which the microneedle assembly is moved depends upon the type of drug to be administered by the assembly. That is, different printhead modules are fluidly connected to sources of different drugs in solution within the fluid delivery system so microneedle assemblies for administering different drugs can be produced by the system 100 without having to change the content of the fluid sources in the fluid delivery system. Again, using instructions retrieved from a memory operatively connected to the controller 80, the controller operates the inkjets of the printhead or printheads in the printhead module opposite the assembly to eject drops 390 of a drug in solution that is supplied from the fluid delivery system to the printhead or printheads. The instructions are configured to operate the inkjets to eject the drops of the drug onto the tips of the microneedles. In one embodiment, the printheads used for drug delivery are W-Series 80 kHz printheads available from Xerox Corporation of Norwalk, Conn. These printheads produce 5 pl drops having a diameter of about 50 µm with directionality errors <15 µm, so the drops are within a three sigma deviation about a norm. The case in which the needle assembly is formed is then closed with a lid or the like and the controller 80 then generates a signal for conveyor synchronization and operates an actuator 40 to rotate the conveyor belt 6 to move the enclosed assembly to a position where it falls into the collection bin.

Figure 4:
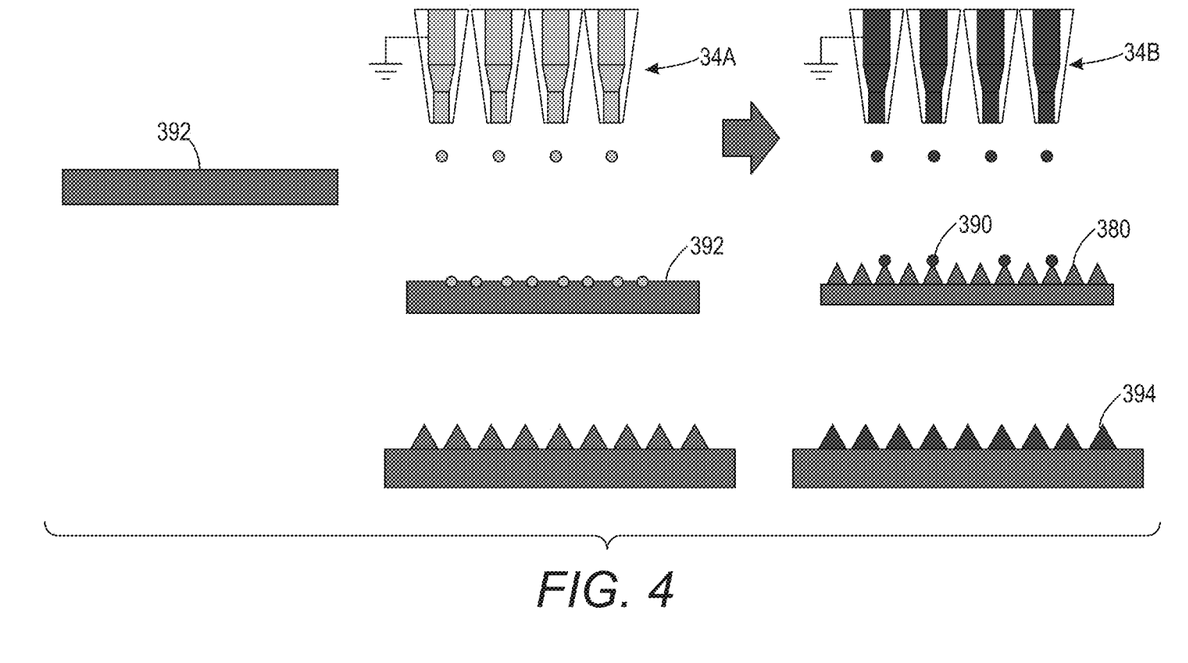
FIG. 4 depicts a process that uses the inkjet printer of FIG. 1 alone to produce the microneedle array on the flexible substrate and apply a drug to the microneedles of the array.

In another embodiment of the system 100, the printer 204 is used without the extruder 108. In this embodiment, as shown in FIG. 4, a substrate 392 made of a biocompatible material is manufactured by a known process and then placed on a conveyor belt 6 that is sized for operation with the printer 304 alone. The controller 80 retrieves from a memory operatively connected to the controller 80 instructions that have previously been generated by a slicer for selectively operating the inkjets of the printhead or printheads in the module 34A to eject an etching fluid upon the biocompatible substrate 392 to form microneedles 394 as previously described. The substrate 392 with the needle structures 394 is shown in an exaggerated form beneath the depiction of the needle etching.

Once the needles are within a toleration range for their length and diameter, the controller 80 operates an actuator 40 to rotate the belt 6 and move the substrate 392 with the microneedles 394 opposite another printhead module. As noted previously, the module to which the microneedle assembly is moved depends upon the type of drug to be administered to the assembly. Again, using instructions retrieved from a memory operatively connected to the controller 80, the controller operates the inkjets of the printhead or printheads in the printhead module to eject drops 390 of a drug in solution that is supplied from the fluid delivery system to the printhead or printheads. The instructions are configured to operate the inkjets to eject the drops of the drug onto the tips of the microneedles. The controller 80 then operates an actuator 40 to rotate the conveyor belt 6 to move the assembly to a position where it falls into the collection bin.

Figure 5:
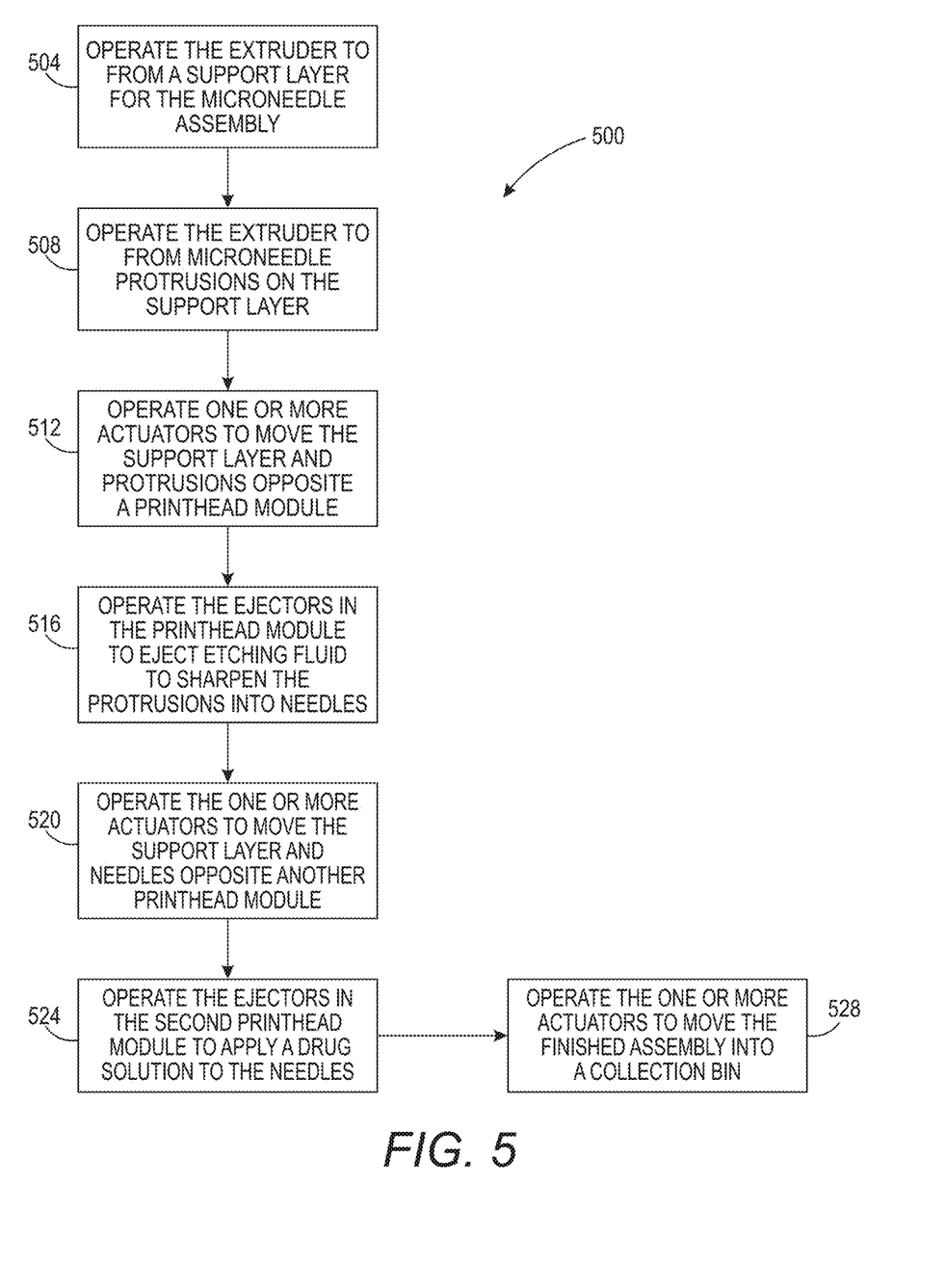
FIG. 5 is a flow diagram of a process for operating the system of FIG. 1.

A process for operating the system 100 to form microneedle assemblies with pre-loaded medicaments is shown in FIG. 5. The process is performed by controllers 80 and 128 executing programmed instructions stored in a memory operatively connected to the controllers and when the controllers execute the instructions, they process data and operate components operatively connected to the controllers to perform the tasks set forth in the flow diagram of the process.

The process 500 begins by operating the extruder to form a support layer using polymer material extruded from one of the extruder manifolds (block 504) and a biocompatible material is extruded from a different manifold to form microneedle protrusions on the surface of the support layer (block 508). One or more actuators are operated to move the conveyor belt so the support layer and microneedle protrusions are positioned opposite a printhead module (block 512). Inkjets of the printhead or printheads in the printhead module are operated to eject an etching fluid upon the microneedle protrusions (block 516) to sharpen the protrusions into needle points using the sensor data to verify the dimensions of the needle points. The actuators are operated to rotate the belt and move the assembly with the sharpened needles opposite an appropriate printhead module for drug application to the needles (block 520). The inkjets of the printhead or printheads in the printhead module are operated to eject drops of a drug in solution from the printhead or printheads onto the microneedles (block 524). The actuator(s) are operated to rotate the conveyor belt and move the microneedle assembly to a position where it falls into the collection bin (block 528).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising: a conveyor; at least one extruder configured to extrude a thermoplastic material toward the conveyor; at least one printhead module having a plurality of ejectors configured to eject drops of a fluid toward the conveyor; at least one actuator operatively connected to the conveyor and the extruder, the at least one actuator being configured to move the extruder in an X-Y plane parallel with an upper surface of the conveyor, and to change a distance between the extruder and the upper surface of the conveyor along a Z-axis perpendicular to the X-Y plane; and a controller operatively connected to the at least one extruder, the at least one printhead module, and the conveyor, the controller being configured to: operate the least one extruder to form a support layer having microneedle protrusions on the upper surface of the conveyor; operate the conveyor to move the support layer having the microneedle protrusions to a position opposite the at least one printhead module; and operate the ejectors in the at least one printhead module to eject drops of a medicament onto the microneedle protrusions; wherein the controller being further configured to: operate a valve assembly to connect a first plurality of nozzles in the at least one extruder to a first manifold to extrude a first material toward the conveyor to form the support layer on the conveyor; and operate the valve assembly to connect a second plurality of nozzles in the at least one extruder to a second manifold to extrude a second material toward the conveyor to form the microneedle protrusions on the conveyor.

2. The apparatus of claim 1, the controller being further configured to:
operate a first extruder to form the support layer on the upper surface of the conveyor; and
operate a second extruder to form the microneedle protrusions on the upper surface of the conveyor.

3. The apparatus of claim 2, the controller being further configured to:
operate a first plurality of ejectors in the at least one printhead module to eject drops of a first fluid toward the microneedle protrusions to sharpen the microneedle protrusions on the support layer; and
operate a second plurality of ejectors in the at least one printhead module to eject the drops of the medicament onto the sharpened microneedle protrusions.

4. The apparatus of claim 1, the controller being further configured to:
operate a first plurality of ejectors in the at least one printhead module to eject drops of a first fluid toward the microneedle protrusions to sharpen the microneedle protrusions on the support layer; and
operate a second plurality of ejectors in the at least one printhead module to eject the drops of the medicament onto the sharpened microneedle protrusions.

5. The apparatus of claim 1 further comprising:
a receptacle; and
the controller being further configured to operate the conveyor to move the support layer having the microneedles into the receptacle after the drops of the medicament are ejected onto the microneedle protrusions.

6. The apparatus of claim 5, the conveyor further comprising:
at least a pair of rollers and an endless belt wrapped about the at least pair of rollers.

7. The apparatus of claim 6, the at least one actuator being operatively connected to one of the rollers in the at least pair of rollers and the at least one actuator being configured to rotate the one roller to rotate the endless belt about the at least pair of rollers.

8. The apparatus of claim 7, the controller being further configured to:
operate the at least one actuator to rotate the one roller for selective rotation of the endless belt about the at least pair of rollers.

9. The apparatus of claim 1, the controller being further configured to:
generate a signal indicative that the support layer having the microneedle protrusions has been formed on the conveyor; and
operating the conveyor to move the support layer having the microneedle protrusions to the position opposite the at least one printhead module in response to the generation of the signal indicative that the support layer having the microneedle protrusions has been formed on the conveyor.

* * * * *